United States Patent [19]

Berner et al.

[11] Patent Number: 5,004,961
[45] Date of Patent: Apr. 2, 1991

[54] WINDOW OPERATOR CONTROL

[75] Inventors: John M. Berner, Golden Valley; Thomas A. Roman, St. Anthony, both of Minn.

[73] Assignee: Truth Incorporated, Owatonna, Minn.

[21] Appl. No.: 511,193

[22] Filed: Apr. 19, 1990

Related U.S. Application Data

[62] Division of Ser. No. 285,661, Dec. 16, 1988, Pat. No. 4,933,613.

[51] Int. Cl.$^5$ ............................................. H02P 1/58
[52] U.S. Cl. ..................................... 318/65; 318/266; 318/286; 318/467; 318/468
[58] Field of Search ................... 318/49, 65, 264, 265, 318/266, 285, 286, 466, 467, 468, 470, 596, 663; 49/24, 28; 388/810

[56] References Cited

U.S. PATENT DOCUMENTS

| | | | |
|---|---|---|---|
| 4,328,451 | 5/1982 | Barge | 318/596 |
| 4,533,901 | 8/1985 | Lederle | 49/28 X |
| 4,563,623 | 1/1986 | Matsuka | 388/810 |
| 4,831,509 | 5/1989 | Jones et al. | 49/28 |
| 4,931,714 | 6/1990 | Yamamoto | 318/286 X |
| 4,939,433 | 7/1990 | Ballyns et al. | 318/466 X |

*Primary Examiner*—Bentsu Ro
*Attorney, Agent, or Firm*—Wood, Phillips, Mason, Recktenwald & VanSanten

[57] ABSTRACT

A control for a window operator is operable to control incremental movement of a window. The control includes means for developing a command to selectively move the window in a direction to an open or closed position, and means for determining when a plurality of motor drives have moved the window a preselected incremental distance. Means are coupled to the developing means and the determining means for energizing each of the motor drives if a command is developed, until the motor drives have moved the window the preselected incremental distance and thereafter deenergizing the motor drives until another command is received to move the window a subsequent incremental distance in the selected direction.

6 Claims, 5 Drawing Sheets

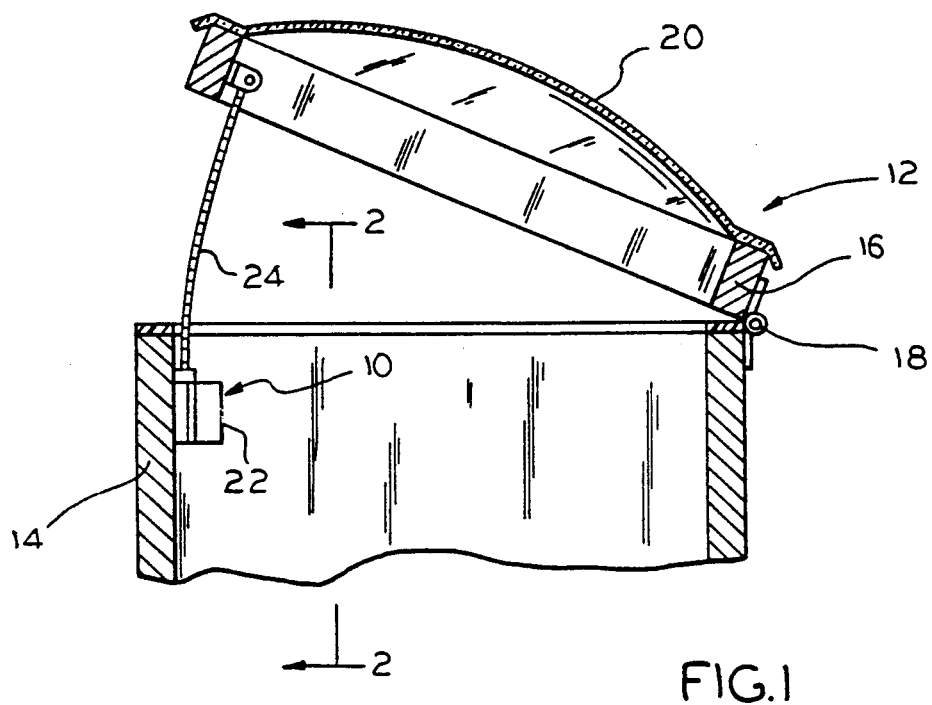
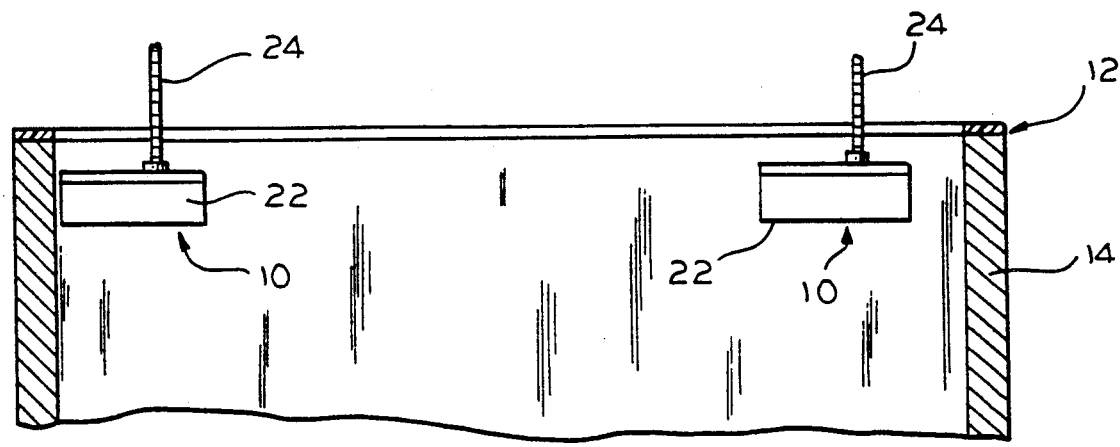

WINDOW OPERATOR CONTROL

This is a division of U.S. Pat. No. 4,933,613.

FIELD OF THE INVENTION

This invention relates to a window operator and, more particularly, to an improved control therefor.

BACKGROUND OF THE INVENTION

Known window units, such as a skylight window, utilize a power unit which can cause extension and retraction of a chain connected to a movable sash of the window for causing opening and closing movement of the window sash. Window operators for skylight windows are known in the art. An example of such a window operator is shown in Tacheny et al. U.S. Pat. No. 4,521,993, owned by the assignee of this application, and the disclosure of which is hereby incorporated by reference herein. This window operator has a chain storable within a housing with the chain being extended from and retracted into the housing by means of a rotatable drive sprocket having a toothed relation with the chain.

The Tacheny et al. patent discloses a two-part housing with a housing base providing for chain storage, chain guiding, and rotatable mounting of the drive sprocket. An upper part of the housing mounts means for driving the rotatable drive sprocket which can either be a manually operable means or a motor drive, as shown in FIG. 5 of the patent.

Prior motorized window operators have used cams to actuate switches which provide direct deenergization of power to the motor at the end of the stroke. However, such operators have proven difficult to adjust.

In certain applications, such as with a larger and heavier window, multiple window operators are required to effectively and safely open and close the window. However, uneven movement of the respective actuators can cause damage to the window. This damage may be in the form of a warped window frame, broken hinges, broken drive chains or a broken window pane.

The present invention is intended to overcome one or more of the problems as set forth above.

SUMMARY OF THE INVENTION

In accordance with the present invention, a power control for operating a window operator permits improved adjustability of motor operation.

Particularly, there is disclosed herein a power control for operating a window operator having a motor controlled actuator for moving a window between fully open and closed positions. The control includes means for receiving electrical power to power the motor to selectively move the window. Electrically controlled switch means are provided for controllably coupling the receiving means to the motor. Means are provided for sensing a desired movement of the window, the sensing means including an electrical switch operable in response to sensing the desired movement. Means are included coupling the switch means and the sensing means for controlling operation of the switch means to couple the receiving means to the motor until the desired movement is sensed by the sensing means.

Specifically, the disclosed power control includes a transistor connected between a source of power and the motor. A limit switch is operable to sense selected movement of the actuator. The limit switch is drivingly coupled to the transistor to deenergize the transistor when the desired movement has been sensed.

More specifically, the sensing means includes means for adjusting the operation of the limit switch so that the preselected desired movement of the actuator can be readily modified.

In accordance with another aspect of the invention, a control for operating a window operator is operable to control incremental movement of a window.

The control according to this other aspect of the invention includes means for receiving a command to selectively move the window in a direction to an open or closed position, and means for determining when the actuator has moved the window a preselected incremental distance. The motor is energized if a command is received by the receiving means, until the actuator has moved the window the preselected incremental distance. Thereafter the motor is deenergized until a subsequent command is received to move the window a subsequent incremental distance in the selected direction.

In accordance with a further aspect of the invention, a control is provided for synchronizing movement of multiple actuators.

Particularly, such a control in accordance with this further aspect of the invention includes means for commanding movement of each of a plurality of electrically controlled actuators to move a window to an open or closed position, and means for determining when each of the actuators has moved the window a preselected incremental distance. Means are coupled to the commanding means and the determining means for selectively, alternately energizing and deenergizing each of the plurality of electrically controlled actuators in a repeatable cycle when movement is commanded by the commanding means, each cycle comprising energizing the actuators until each actuator has moved the window the preselected incremental distance and thereafter deenergizing the actuators for a preselected minimum time, to provide continuous and even movement of the window.

Further features and advantages of the invention will readily be apparent from the specification and from the drawings.

BRIEF DESCRIPTION OF THE DRAWINGS

FIG. 1 is a central sectional view of a skylight window including a chain operator mounted to the window, with the window in an open position;

FIG. 2 is a sectional view taken along the line 2—2 of FIG. 1;

DESCRIPTION OF THE INVENTION

Figure 3:
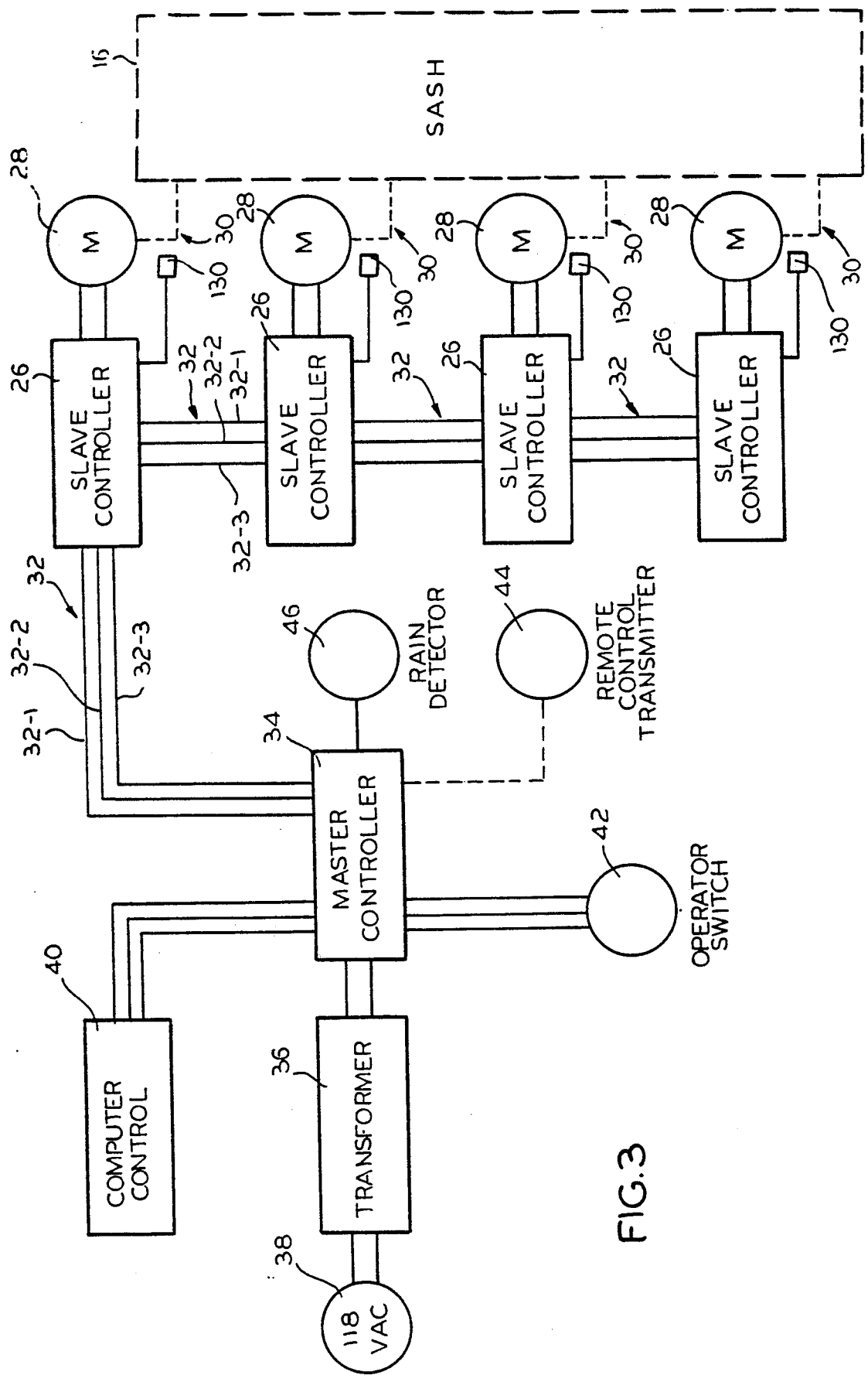
FIG. 3 is a block diagram of a control for the window operator of FIG. 1.

A window operator, indicated generally at 10 in FIG. 1, is shown mounted for operation of a window and particularly a skylight window 12 having a frame 14 and a sash 16 hinged to the frame 14 with a conventional hinge 18. The sash 12 has a pane in the form of a dome member 20 which transmits light. The window 12 is shown with the sash 16 in the open position. The operator 10 has a number of associated components for opening and closing the window 12. These components include a housing 22 and a chain 24 connected to the window sash 16 for opening movement of the window 12.

The operation of the window operator 10 is as shown and described in detail in the Tacheny et al. patent incorporated by reference herein, and in Berner et al. U.S. Pat. No. 4,945,678, entitled Window Operator, owned by the assignee of the present invention the specification of which is hereby incorporated by reference herein.

The Berner et al. application discloses a window operator having a motor drive for opening and closing of a window, with the motor being drivingly connected to a drive output member through an intermediate gear structure. A clutch device in the drive structure senses a torque applied to the drive output member and a switch operable by the clutch is effective to deenergize the motor when the torque applied to the output member reaches a predetermined value upon the windows reaching a desired closed position. The switch can be adjustably located relative to the clutch whereby the predetermined value at which the motor is deenergized may be varied in order to obtain a desired tension on a chain connected to the sash of a skylight window, the desired tension representing the desired closed position.

The Berner et al. application also discloses a limit switch operable to sense when the window has reached a desired open position and to deenergize the motor at such time.

Referring to FIG. 2, for large windows, the window 12 is provided with two or more such operators 10 for moving the window 12 between the open and closed positions. Specifically, each of the operators 10 is operated simultaneously to move the sash. Multiple operators may be required, for example, with large windows wherein added power is required to move the weight of the sash.

Referring to FIG. 3, a block diagram illustrates a control according to the invention for four window operators 10.

Particularly, as described in the Berner et al. application incorporated by reference herein, each operator 10 includes a slave controller 26 for controllably energizing and deenergizing a prime mover in the form of a motor 28, which is drivingly connected by drive means, indicated generally by a dashed line 30, which includes the chain 24, to the skylight sash 16.

In FIG. 3, each of the motors 28 is shown coupled by its drive means 30 to the sash 16. As is apparent from the above, in a large skylight window there is only a single sash which is linked at preselected sash positions to each of the drive means 30. Alternatively, if it is desired to simultaneously control a plurality of discrete and separate skylight windows, then each of the drive means 30 may be connected to the sash of a separate window, as is obvious, In this latter application each of the slave controllers 26 is mounted to the frame of the respective associated window.

Each of the slave controllers 26 is coupled to one another via signal lines 32, described in greater detail below, and to a master controller 34. The signal lines 32 include first and second lines 32-1 and 32-2 for transmitting a bidirectional actuator command, and a third line 32-3 for transmitting feedback information. Particularly, the actuator command is generated by the master controller 34 to cause each of the slave controller 26 to energize its respective associated motor 28. The feedback on the line 32-3 is transmitted from the slave controllers 26 to the master controller 34 to provide an indication when all of the slave controllers have completed a preselected incremental movement of the window by its drive means 30, as described in greater detail below.

The master controller 34 receives power from a transformer 36 which is coupled to a source 38 of standard 120 volt AC power. Also, the master controller 34 may be coupled, as necessary or desired, to a computer control 40, an operator switch 42, a remote control transmitter 44 and a rain detector 46. Particularly, the computer control 40, operator switch 42 and the remote control transmitter 44 are used to command movement to selectively open or close the window. The rain detector 46 is similarly used to command closing of the window when rain is sensed.

Figure 4:
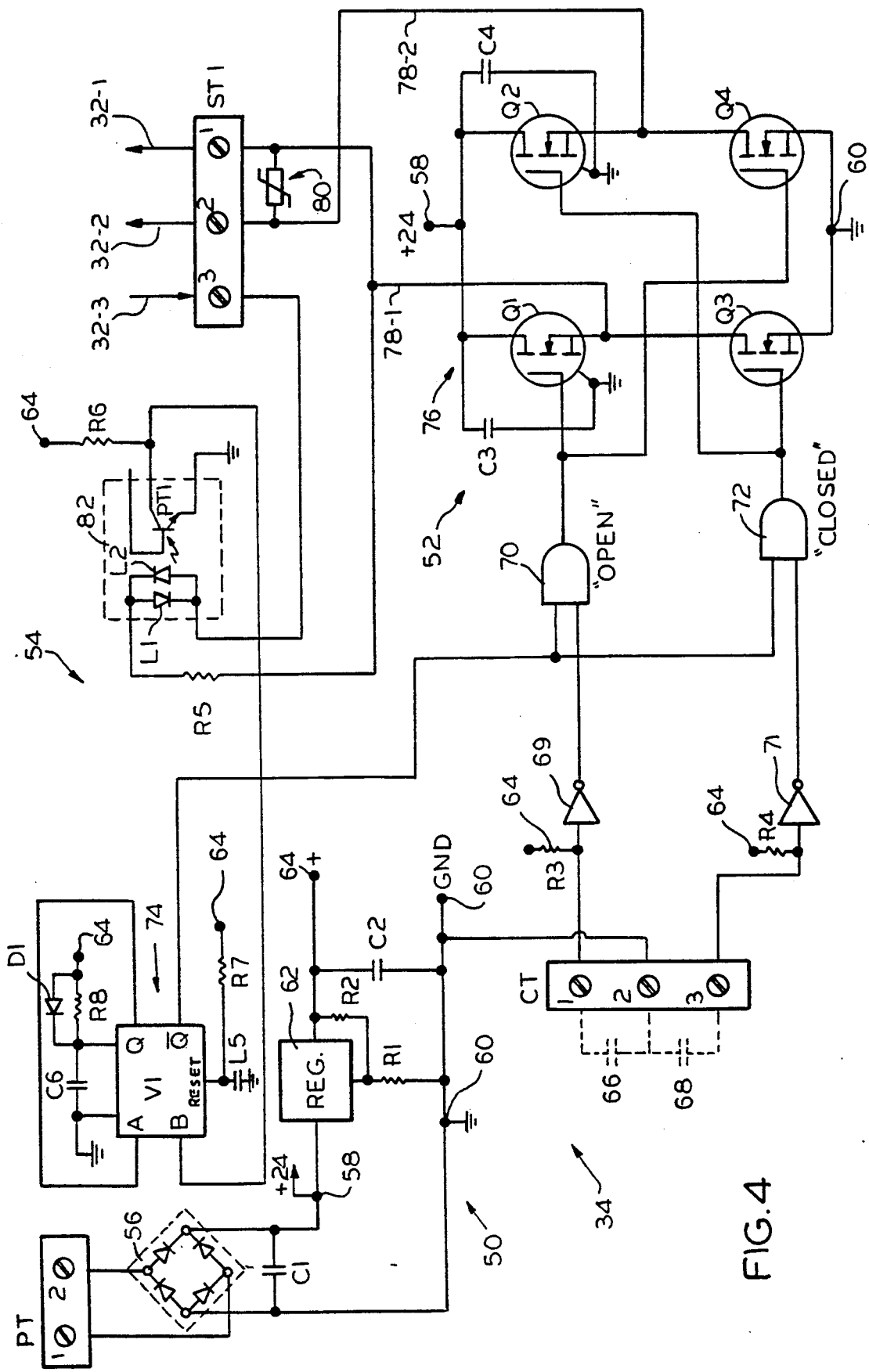
FIG. 4 is an electrical schematic for the master controller of FIG. 3.

Referring to FIG. 4, an electrical schematic illustrates a circuit for the master controller 34 of Fig. 3. The master controller circuit includes a power circuit 50, a command circuit 52 and a feedback circuit 54.

The power circuit 50 includes a terminal block PT including first and second terminals for connecting the master controller 34 to the transformer 36, see FIG. 3. When reference herein is made to a terminal, such as a terminal 1 of terminal block PT, the terminal will be indicated with a prefix representing the terminal block and a suffix representing the terminal number. For example, the first terminal of the PT terminal block is referred to herein as PT-1.

A bridge rectifier circuit 56 is coupled across the terminals PT-1 and PT-2 and with an output capacitor Cl converts unregulated AC power to unregulated DC power of, for example, 24 volts, across a high voltage node 58 and ground, indicated by a reference node 60. Coupled between the nodes 58 and 60 are a conventional voltage regulator 62, resistors R1 and R2 and a capacitor C2, to develop regulated 5 volt DC power between a low voltage node 64 and ground.

The command circuit 52 is operable to develop a bipolar directional command on the command lines 32-1 and 32-2 to the slave controllers 26 to command operation thereof.

The command circuit 52 includes a command terminal block CT including three terminals for connecting to a receiver circuit (not shown). The receiver circuit receives signals from any of the computer control 40, the operator switch 42, the rain detector 46 and the remote control transmitter 44 to command movement of the window and includes priority and timing logic. The receiver circuit includes the logical equivalent of first and second normally open contacts 66 and 68, as indicated in dashed lines. The first contact is coupled between the terminals CT-1 and CT-2, while the second contact 68 is coupled between the terminals CT-2 and CT-3. The terminal CT-2 is also coupled to the low voltage power node 64. The terminals CT-1 and CT-3 are respectively coupled through first and second inverters 69 and 71 to first and second AND gates 70 and 72, and through resistors R3 and R4 to the low voltage mode 64.

In operation, if movement is commanded to move the window to the open position, then the first contact 66 is closed so that the input at the first inverter 69 is low and therefore, a logic high condition is applied at one input of the first AND gate 70. Similarly, if movement is commanded to close the window, then the second contact 68 closes to provide a low input at the second inverter 71 so that a logic high condition exists at one input of the second AND gate 72. A second input of each of the AND gates 70 and 72 is received from a timer circuit 74 which forms part of the feedback circuit 54, described in greater detail below.

The outputs of the first and second AND gates 70 and 72 are connected to a conventional H-bridge circuit 76 including four field effect transistors (FET's) Q1-Q4 interconnected in a conventional H-bridge configuration. Power to the H-bridge circuit 66 is received from the high voltage node 58 and ground. The H-bridge circuit 76 develops a bipolar output command on first and second lines 78-1 and 78-2 to first and second terminals of a first switch terminal block ST1. The respective terminals ST1-1 and ST1-2 are also connected to the lines 32-1 and 32-2 and thus to the slave controllers 26, see FIG. 3. Also, a transient absorber 80 is connected across the lines 78-1 and 78-2.

As is well known, the H-bridge circuit 76 is used to switch both sides of a power source, in this case the unregulated 24 volt DC power. Particularly, when the output of the first AND gate 70 is high, indicating an open command, then the first and fourth FETS Q1 and Q4 conduct, thereby coupling the 24 volt high voltage node 58 through the first FET Q1 and the first output line 78-1 to the first command line 32-1, and the ground node 60 through the fourth FET Q4 and the second output line 78-2 to the second command line 32-2. Accordingly, the second command line 32-2 is at ground potential and the first command line 32-1 is at 24 volts DC potential.

Conversely, if the output of the second AND gate 72 is high, then the second and third FETs Q2 and Q3 conduct. Resultantly, the high voltage node 58 is connected through the second FET Q2 and the second output line 78-2 to the second command line 32-2; and the ground node 60 is connected through the third FET Q3 and the first output line 78-1 to the first command line 32-1. Accordingly, the first command line 32-1 is at ground potential, and the second command line 32-2 is at 24 volt DC potential.

If neither of the AND gates 70 and 72 has a logic high output, then all of the FETs Q1-Q4 are nonconducting and there is no potential difference between the command lines 32-1 and 32-2.

The feedback circuit 54 includes an AC input coupler 82. The AC input coupler 82 is of conventional construction and includes parallel reversed connected LEDs L1 and L2 and a photo-transistor PT1 having a base current switched on/off by sensed illumination from one of the LEDs. The LEDs L1 and L2 are connected via a resistor R5 to the terminal ST1-1 and to the terminal ST-3 which is coupled to the feedback line 32-3. The emitter of the transistor PT1 is coupled to ground, while the collector thereof is connected through a resistor R6 to the low voltage node 64 and to the timer circuit 74.

The timer circuit 74 includes a timer U1 such as a type 4538 multivibrator. The timer U1 has a non-inverted output Q connected to a first input A to provide non-retriggerable operation. A second input B is connected to the collector of the transistor PT1. An inverted output $\bar{Q}$ is connected as the second input to the first and second AND gates 70 and 72 of the command circuit 52, described above.

The timing circuit provides a low pulse output at the inverted output $\bar{Q}$ of the timer U1 whenever the signal at the B terminal goes from high to low. The duration of the pulse is determined by a circuit including a capacitor C6 and a resistor R8. A diode D1 acts to protect the timer U1 if the voltage at the node 64 goes low before the capacitor C6 discharges.

Normally, the photo-transistor 82 is non-conductive so that the collector of the transistor PT1, and thus the B input of the timer U1 is high. If, however, either of the LEDs L1 or L2 is illuminated, as described below, then the transistor PT1 is rendered conductive, switching the collector thereof to ground and causing the input at the B terminal of the timer U1 to go from high to low. Resultantly, the non-inverted output goes high, and the inverted output goes low Thus, when the transistor PT1 is switched on, then the second input at the AND gates 70 and 72 goes low, thereby inhibiting operation of the H-bridge circuit 76 so that no potential is developed across the command lines 32-1 and 32-2. Therefore, the power to the slave actuator 26 is removed and the window does not move.

Figure 5:
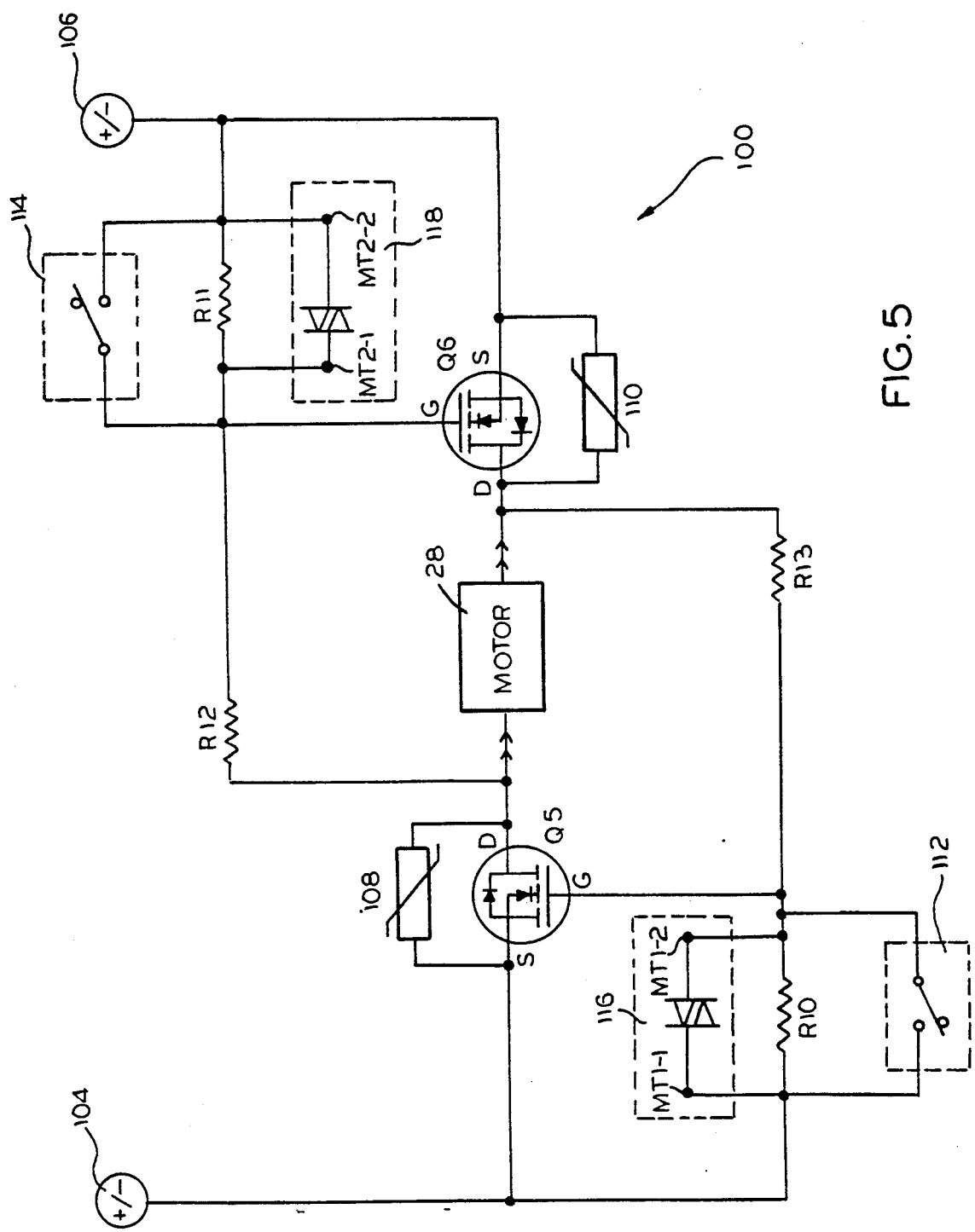
FIG. 5 is an electrical schematic of a power circuit of the slave controller of FIG. 1.
Figure 6:
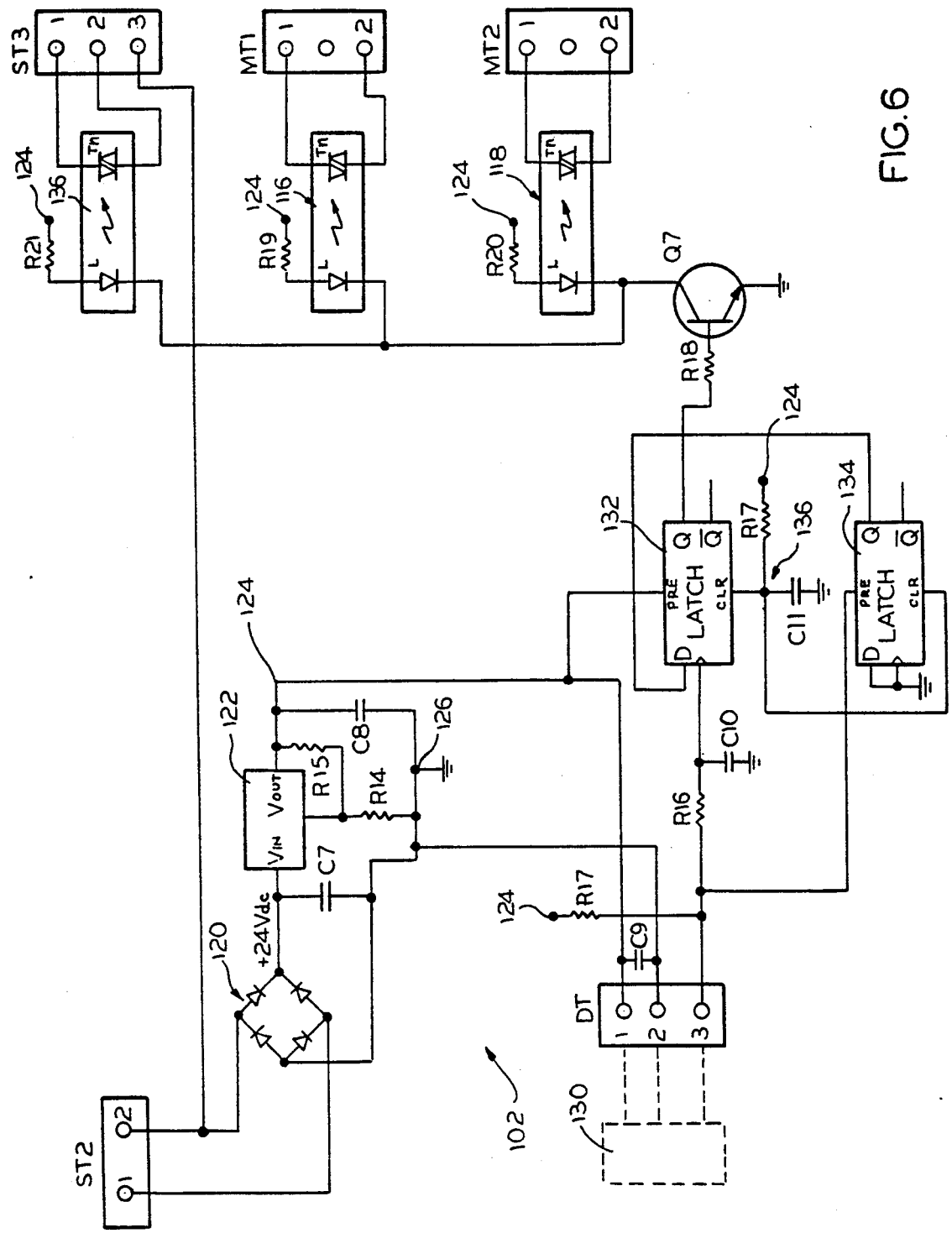
FIG. 6 is an electrical schematic of a synchronizing circuit of the slave controller of FIG. 1.

To control operation of its associated motor 28, each of the slave controllers 26 is provided with a power circuit 100, see FIG. 5, and a synchronizing circuit 102, see FIG. 6.

The power circuit 100 includes first and second bipolar input terminals 104 and 106. The terminals 104 and 106 are respectively coupled via the command lines 32-1 and 32-2 to terminals ST1-1 and ST1-2 of the master controller, see FIG. 4. Particularly, the terminals 104 and 106 of each slave controller 26 are connected in parallel with one another, if there is more than one slave controller 26.

Coupled between each of the terminals 104 and 106 and the motor 28 are first and second power FETs Q5 and Q6, respectively. Specifically, the source element of the first FET Q5 is connected to the first terminal 104. The source element of the second FET Q6 is connected to the second terminal 106. The drain elements of each FET Q5 and Q6 are connected to opposite sides of the motor 28. First and second transient absorbers 108 and 110 are connected across the FETs Q5 and Q6, respectively. A resistor R10 is connected between the gate element of the first FET Q5 and the first terminal 104. Similarly, a resistor R11 is connected between the gate element of the second FET Q6 and the second input terminal 106. Also, the drain of the first FET Q5 is connected through a resistor R12 to the gate of the second FET Q6, and the drain of the second FET Q6 is connected through a resistor R13 to the gate of the first FET Q5.

First and second limit switches 112 and 114 are connected in parallel with the resistors R10 and R11, respectively. Each of the limit switches 112 and 114 includes a normally opened contact. Particularly, the limit switch 112 comprises the torque sensing limit switch described in the Berner et al application incorporated by reference herein for sensing when the window is in the full closed position, while the limit switch 114 comprises the open position switch in such Berner et al. application which provides an indication when the window is in a desired open position. As is well know, when each of such switches 112 and 114 is actuated, its contact moves to the closed position.

Also coupled in parallel with each resistor R10 and R11 is an optically coupled triac circuit 116 and 118, respectively, which form part of the synchronizing circuit of FIG. 6, discussed below.

Under normal conditions, with no voltage difference across the terminals 104 and 106, the motor 28 is deenergized. Assuming the limit switches 112 and 114 are in their normally open position, and the triacs 116 and 118 are non-conductive, if a sufficiently high voltage potential is present across the terminals 104 and 106, then the motor 28 is energized. For example, if the window is commanded to open, as discussed above, then the command line 32-2 which is coupled to the second terminal 106 is at ground potential and the command line 32-1 which is coupled to the first terminal 104 is at 24 volt potential. Resultantly, the first FET Q5 conducts through its built-in diode to cause conduction therethrough to the motor 28. Simultaneously, with the 24v voltage applied through the diode of the first FET Q5 to the resistors R12 and R11 the voltage at the gate of the second FET Q6 rises high enough to turn on the second FET Q6. The second FET Q6 being on shorts the opposite side of the motor 28 to ground. This provides 24 volts across the motor 28 causing it to energize and move the window as described in the Berner et al. application. If the window reaches its full open position, then the contact of the limit switch 114 closes, shorting out the resistor R11, thus connecting the gate of the second FET Q6 to ground so that the second FET Q6 is non-conductive. Therefore, the motor 28 is deenergized and further movement in the open direction is prevented. Similarly, if the second triac circuit 118 is conductive, as discussed below, then the motor is also deenergized.

If, alternatively, movement is commanded to close the window, then the first terminal 104 is at ground potential and the second terminal 106 is at 24 volt potential. Resultantly, the second FET Q6 conducts through its built-in diode, and the first FET Q5 is gated on from the voltage applied through the diode of the second FET Q6 to the resistors R13 and R10. The voltage at the gate of the first FET Q5 rises high enough to cause it to turn on, resulting in the motor being connected across the terminals 104 and 106 to provide rotation of the motor shaft 28 in the opposite direction to move the window to the closed position. Upon the limit switch 112 sensing the desired torque level, the contact closes, shorting out the resistor R10 to shut off the first FET Q5 and deenergize the motor 28. Similarly, if the first triac circuit 116 is conductive, as discussed below, then the motor 28 is also deenergized.

With the above described power circuit 100, the position of the limit switches 112 and 114 can be readily adjusted, as described in the Berner et al. application, to adjust the open and closed position at which the motor is deenergized. Particularly, the relatively high motor voltage is controlled through the first and second power FETs Q5 and Q6 which are controlled by a smaller control voltage through the limit switches 112 and 114 and the triacs 116 and 118. This provides a circuit which together with the clutch mechanism and limit switches is more readily adjustable than with prior art cam operated switches which are operable to directly cut off power to the motor.

As discussed above, in a window which includes multiple operators, it is desirable to provide continuous and even movement of each actuator to provide continuous and even movement of the window in order to prevent damage thereto.

Referring to FIG. 6, the synchronizing circuit 102 includes the first and second optically coupled triac circuits 116 and 118, discussed above relative to FIG. 5. Each of the optically coupled triac circuits 116 and 118 includes an LED L and a triac TR. As is well known, the triac TR and LED L are built into a single integrated circuit. The triacs TR of each circuit 116 and 118 are respectively connected to terminals 1 and 2 of the terminal blocks MT1 and MT2, respectively. The terminals of the blocks MT1 and MT2 are connected across the resistors R10 and R11, see FIG. 5.

The synchronizing circuit 102 includes switch terminal blocks ST2 and ST3. The terminal block ST2 includes terminals 1 and 2 which are connected to the command lines 32-1 and 32-2, respectively, see FIG. 3. Specifically, the bipolar command voltage from the master controller 34 is present at the terminal block ST2 as determined by the H-bridge circuit 76, see FIG. 4, discussed above. Coupled across the terminals ST2-1 and ST2-2 is a bridge rectifier circuit 120 which rectifies the bipolar command voltage for use by the synchronizing circuit 102. Particularly, coupled across the output of the rectifier circuit 120 is a voltage regulator 122 which converts unregulated 24 volt DC power from the bridge rectifier 120 to 5 volt DC power between a low voltage node 124 and ground potential at a reference node 126.

To synchronize operation of each of the motors 28, a position detector 130, see also FIG. 3, is provided for sensing preselected incremental movement of the window caused by the motor 28. Such a position detector 130 might comprise, for example, a conventional sensor which senses each revolution of the operator drive sprocket, or a magnetic sensor for sensing each revolution of one of the gears in the power drive from the motor 28 to the drive sprocket. Such a position detector 130 is coupled to a detector terminal block DT having first, second and third terminal connections. The detector 130 is coupled to the power node 124 and the ground node 126 through the respective terminals DT-1 and DT-2. A sensor output is connected to the terminal DT-3. The third detector terminal connection DT-3 is also connected through a resistor R16 to a clock input of a first latch circuit 132 and to a "preset" input of a second latch circuit 134. Each of the latch circuits 132 and 134 may comprise, for example, a dual D-type positive-edge-trigger flip flop of a conventional type 74HC74N circuit as is well known.

A "clear" input of each of the latch circuits 132 and 134 is connected through a time delay circuit 136 to the power node 124. A data input of the first latch circuit is connected to a non-inverted output of the second latch circuit 134. Data and clock inputs of the second latch circuit 134 are connected to ground. A non-inverted output of the first latch circuit 132 is connected through a resistor R18 to the base of a transistor Q7.

The latch circuits 132 and 134 are interconnected, as shown, so that when power is first applied to the synchronizing circuit 102 at the terminals ST2-1 and ST2-2, the latch circuits are "cleared". This causes the non-inverted output of the first latch circuit 132 to go low so that the transistor Q7 is shut off.

In applications wherein a magnetic sensor is used for the position detector 130, the sensor is operable to provide a low level signal at the terminal DT-3 if a magnet is present in the field of the sensor. This occurs once each revolution, as discussed above. Otherwise a high level signal, i.e., 5 volts, is present at the terminal DT-3. The first latch circuit 132 is set on the low to high transition at the clock input when the preset and clear inputs are high. Thus, when the magnet enters and then leaves the field of the detector 130, the clock input of the first latch circuit 132 goes high causing its output to be set and thereby turning on the transistor Q7. The second latch circuit 134 sets its non-inverted output high when the "preset" terminal goes low, i.e. when the magnet enters the field of the detector 130. Since the non-inverting output of the second latch 134 is connected to the data input of the first latch 132, the second latch circuit 134 prevents the first latch 132 from being set prior to the rising edge of its clock input; e.g., the latch 134 must have its output set high by the magnet entering the sensing field of the sensor 130, before the latch 132 can respond to the rising edge of the signal from the sensor 130 via the signal at terminal DT-3. When the latch 132 responds by setting its non-inverted output high, the transistor Q7 turns on, thereby turing on the optically coupled triac circuits 118 and 116 which in turn shut off the power to the motor 28.

The latch circuits 132 and 134 are reset by the clear terminal going low as discussed below.

The LEDs of the optically coupled triacs 116 and 118 are coupled through respective resistors R19 and R20 between the power node 124 and the collector of the transistor Q7. The emitter of the transistor Q7 is connected to ground. A third optically coupled triac 136 also includes an LED L connected in series with a resistor R21 between the power node 124 and the collector of the transistor Q7. The triac TR of the third optically coupled triac 136 is connected to first and second terminals of the terminal block ST3. The third terminal ST3-3 thereof is connected to the terminal ST2-2 of FIG. 6.

If the transistor Q7 is turned off, then none of the optically coupled triac circuits 116, 118 and 136 have their LEDs L conducting. The triacs TR are turned on by the LEDs L conducting; but the respective voltage applied to each triac TR must be reduced to zero in order for the triacs to return to the non-conducting state. The first and second triac circuits 116 and 118 are coupled to the actuator power circuit 100, see FIG. 5, and are operable to deenergize the motor 28 when the transistor Q7 is turned on. Resultantly, after each revolution of the magnet, as sensed by the detector 130, the transistor Q7 is turned on and the triacs TR of the optically coupled triacs 116 and 118 conduct to deenergize the motor 28, as discussed above relative to FIG. 5.

The third optically coupled triac 136 is used as a feedback to provide synchronization among each of the slave controllers 26. Particularly, the terminals of the block ST3 of each slave controller 26 are series connected in a daisy chain configuration to provide a feedback to the feedback circuit 54 of the master controller 34, see FIG. 4, after each of the slave controllers has operated its associated motor 28 to provide a preselected incremental movement of its drive 30 to move the window a preselected amount. Specifically, in use, the terminal ST1-3 of the master controller 34 is connected over the feedback line 32-3 to the terminal ST3-1 of the first in the series of slave controllers 26. The second terminal ST3-2 of the first slave controller is connected to the first terminal ST3-1 of the next in the series of slave controllers 26, and so on and so forth to the last of the slave controllers 26. With the last of the slave controllers 26, the terminals ST3-2 and ST3-3 are jumpered together.

Resultantly, as the transistor Q7 of each of the slave controllers is turned on, its associated third optically coupled triac 136 is switched on to short the terminals ST3-1 and ST3-2. When these terminals of each of the slave controllers are shorted, then with reference also to FIG. 4, a completed circuit is provided from one side of the LEDs of the photo-transistor 82 through the terminal ST1-3 and the shorted terminals ST3-1 and ST3-2 of each of the slave controller synchronizing circuits 102 to the last of the slave controllers, and thereafter through the jumpered terminals ST3-2 and ST3-3 to the terminal ST2-2 of the slave controller (see FIG. 6) synchronizing circuit 102 and back through the line 32-2 to the terminal ST1-2 of the master controller. The other side of the LEDs of the photo-transistor 82 is connected to the terminal ST1-1, through a resistor R5. Accordingly, when all the motors 28 have been shut off, the 24 volt potential difference between the terminals ST1-1 and ST2-2 is coupled across the LEDs L1 and L2 of the bipolar photo-transistor 82 causing the transistor PT1 thereof to conduct to energize the timer circuit 74, as discussed above. When the timer circuit energizes, the AND circuits 70 and 72 are set low for the preselected time delay, and the H-bridge circuit 76 is deenergized to remove the command on the output 78-1 and 78-2. When the command power is removed, then with reference to FIG. 6, the output of the voltage regulator 122 goes low causing the latch circuits 132 and 134 to reset and turn off the transistor Q7. With power removed from the output 78-1 and 78-2, the optically coupled triac circuits 116 and 118 also shut off Thereafter, when the time delay of the timer circuit 74 is completed, then the inhibit to the AND gates 70 and 72 is removed and each of the motors 28 is again energized, assuming movement is still commanded and the outer limits have not been reached, or another incremental cycle of operation.

Summarizing the operation of the above-described circuits, the master controller 34 provides a bipolar directional command to the actuator power circuits 100 of each of the slave controllers 26 according to the polarity of the power applied to the terminals 104 and 106 of each such circuit 100 to cause energization of the motors 28. Simultaneously, the detector 130 of each slave controller synchronizing circuit 102 determines the time at which a preselected incremental movement of the magnet, and thus window as caused by the drive 30, has been completed at a preselected rotational check point, causing its associated motor 28 to be deenergized. A feedback is provided to the master controller 34 after all of the motors are deenergized. The master controller 34 then inhibits the command to each slave controller 26 for a preselected minimum time period to allow the latch circuits 132 and 134 to reset before reapplying the command. Resultantly, each of the operators 10 provides for incremental continuous movement in both the opening and closing direction of the window operator on a single skylight window, with multiple motor operators on one skylight window.

More specifically, if directional movement is commanded, then movement by each of the plurality of operators is provided in a cyclical operation wherein each cycle comprises equal incremental movement of the drive of each operator. As each operator completes the preselected incremental movement, it is deenergized and waits until all of the other operators have completed the incremental movement at which time the cycle ends and a new cycle begins after a preselected minimum delay period to allow the latching circuits to reset for the next cycle.

Thus, the invention broadly comprehends a master control circuit and a synchronizing circuit for controllably operating a plurality of operators to obtain continuous and even movement of a skylight window, and a power circuit which provides for ready adjustment of overall movement parameters of the skylight window.

We claim:

1. A control for operating a window operator having an electrically controlled drive for moving a window in preselected incremental movements between fully open and closed positions, comprising:
    means for receiving a command to selectively move the window in a direction to the open position or the closed position;
    means for determining when the drive has moved the window a preselected incremental distance, less than a distance between fully open and closed positions;
    control means coupled to said receiving means and said determining means for enabling energization of the electrically controlled drive when a command is received by said receiving means until the drive has moved the window said preselected incremental distance and thereafter inhibiting energization of the drive until another command is received to move the window a subsequent incremental distance in the selected direction.

2. A control for operating a window operator having an electrically controlled drive for moving a window between open and closed positions, comprising:
    means for receiving a command to selectively move the window in a direction to the open position or the closed position;
    means for determining when the drive has moved the window a preselected incremental distance;
    control means coupled to said receiving means and said determining means for enabling energization of the electrically controlled drive when a command is received by said receiving means until the drive has moved the window said preselected incremental distance and thereafter inhibiting energization of the drive until another command is received to move the window a subsequent incremental distance in the selected direction, wherein said control means includes a latch circuit which inhibits energization of the drive after the drive has moved the window the preselected incremental distance as determined by said determining means.

3. The control of claim 2 wherein said latch circuit reenables energization of the drive after a subsequent command is received to move the window a subsequent incremental distance in the selected direction.

4. A window operator power control for operating a window operator having an electrically controlled drive for moving a window between open and closed positions, comprising:
    means for receiving electrical power to power the drive to selectively move the window in a direction to the open or closed position;
    electrically controlled switch means comprising first and second transistors for controllably coupling the receiving means to the drive;
    means comprising a switch for sensing a desired movement of the window; and
    means coupled to said switch means and said sensing means for controlling operation of said switch means to couple said receiving means to the drive until said desired movement is sensed by said sensing means, said controlling means coupling said switch to said transistors to operate said transistors to uncouple the drive from said receiving means when said desired movement is sensed by said sensing means.

5. The power control of claim 4 wherein said receiving means includes means for receiving a bipolar power signal with the polarity of the signal being determined according to whether movement is desired to move the window to the open position or the closed position, and wherein said switch means couple the drive to said receiving means regardless of the polarity of the power signal.

6. A window operator power control circuit for operating a window operator having a motor drive for moving a window between open and closed positions, comprising:
    means for receiving bipolar electrical power to power the motor drive to selectively move the window in a direction to the open or closed position;
    first and second transistors coupled between said receiving means and the motor drive;
    means coupled to said receiving means and said transistors for driving said transistors if power is received by said receiving means;
    a limit switch for sensing a desired movement of the window; and
    means coupling said limit switch and said driving means for disabling said driving means to drive said transistors to uncouple the receiving means for the motor drive when said desired movement is sensed by said switch means.

* * * * *